(12) United States Patent
Salter et al.

(10) Patent No.: US 9,802,531 B2
(45) Date of Patent: Oct. 31, 2017

(54) VEHICLE REAR ILLUMINATION

(71) Applicant: Ford Global Technologies, LLC, Dearborn, MI (US)

(72) Inventors: Stuart C. Salter, White Lake, MI (US); James J. Surman, Clinton Township, MI (US); Annette Lynn Huebner, White Lake, MI (US); Cornel Lewis Gardner, Romulus, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/384,753

(22) Filed: Dec. 20, 2016

(65) Prior Publication Data

US 2017/0210281 A1 Jul. 27, 2017

Related U.S. Application Data

(63) Continuation of application No. 15/007,596, filed on Jan. 27, 2016, now Pat. No. 9,586,519.

(51) Int. Cl.
*B60Q 1/26* (2006.01)
*B60Q 11/00* (2006.01)
*B60Q 1/30* (2006.01)
*B62D 25/12* (2006.01)
*B60Q 3/06* (2006.01)

(52) U.S. Cl.
CPC ............ *B60Q 1/30* (2013.01); *B60Q 3/06* (2013.01); *B62D 25/12* (2013.01); *B60Q 2400/40* (2013.01)

(58) Field of Classification Search
CPC .. B60Q 1/30; B60Q 3/008; B60Q 3/06; B60Q 2400/40; B62D 25/087; B62D 25/12
USPC ................... 362/487, 496, 509–510
See application file for complete search history.

(56) References Cited

U.S. PATENT DOCUMENTS

| | | |
|---|---|---|
| 2,486,859 A | 11/1949 | Meijer et al. |
| 4,851,970 A | 7/1989 | Bronder |
| 4,896,136 A | 1/1990 | Hotovy |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A vehicle is presented that includes a lift gate operably connected to a body and operable between open and closed positions. A taillight is positioned at a rear end of the body. A cargo lamp is positioned on an inboard surface of the taillight such that the cargo lamp is concealed when the lift gate is in the closed position.

20 Claims, 4 Drawing Sheets

(56) References Cited

U.S. PATENT DOCUMENTS

| | | |
|---|---|---|
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0130902 A1 | 7/2004 | Snyder et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 12933380 A2 | 3/2003 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

US 9,802,531 B2

VEHICLE REAR ILLUMINATION

CROSS-REFERENCE TO RELATED APPLICATION

This application is a continuation of U.S. patent application Ser. No. 15/007,596, filed on Jan. 27, 2016, entitled VEHICLE REAR ILLUMINATION, now issued as U.S. Pat. No. 9,586,519 the entire contents of which are hereby incorporated herein by reference.

FIELD

The present invention generally relates to vehicle lighting systems and more particularly relates to vehicle lighting systems for use at or near the rear of vehicles.

BACKGROUND

Illumination in cargo spaces and behind the vehicle may be useful under low lighting conditions. Use of unique lighting assemblies offers a unique, useful and attractive viewing experience. It is therefore desired to implement such structures in automotive vehicles for various lighting applications.

SUMMARY OF THE DISCLOSURE

According to one aspect of the present disclosure, a vehicle includes a lift gate operably connected to a body and operable between open and closed positions. A taillight is positioned at a rear end of the body. A cargo lamp is positioned on an inboard surface of the taillight such that the cargo lamp is concealed when the lift gate is in the closed position.

According to another aspect of the present disclosure, a vehicle includes a body defining a cargo space therein. The body is coupled with a lift gate operable between substantially open and closed positions. A taillight is positioned at a rear end of the body. A cargo lamp is positioned proximate a top of an inboard surface of the taillight. The cargo lamp is configured to emit light.

According to yet another aspect of the present disclosure, a vehicle includes a body defining a cargo space therein. A door is operable between substantially open and closed positions. The door is configured to provide access to the cargo space in the open position. A taillight is positioned at a rear end of the body. The taillight defines a cargo lamp configured to illuminate the cargo space and a ground below the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items. For example, if a composition is described as containing components A, B, and/or C, the composition can contain A alone; B alone; C alone; A and B in combination; A and C in combination; B and C in combination; or A, B, and C in combination.

Figure 1A:
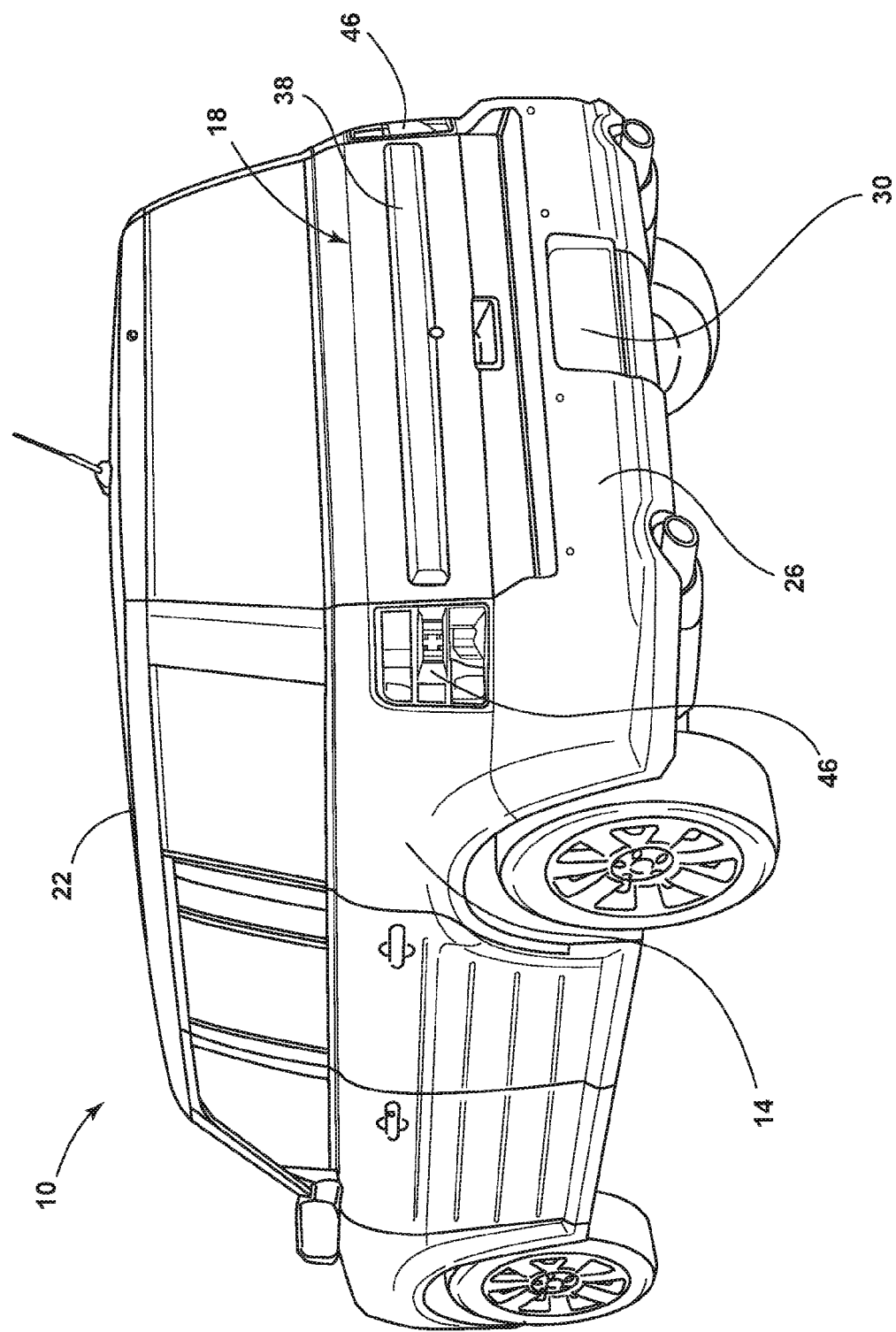
FIG. 1A illustrates a rear perspective view of a vehicle having a having a lift gate in an closed position, according to one embodiment.
Figure 1B:
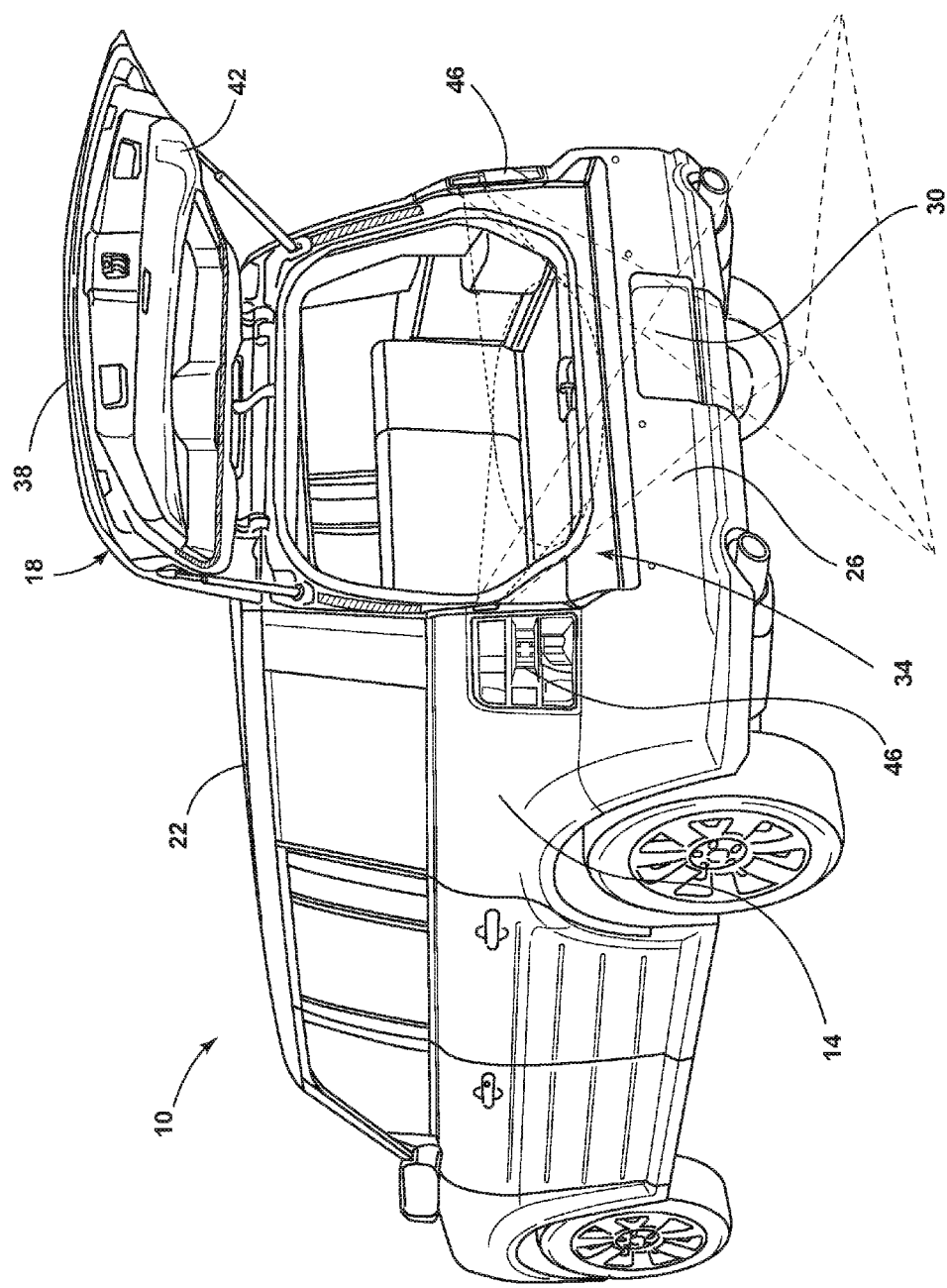
FIG. 1B illustrates a rear perspective view of the vehicle having the having a lift gate in a open position and a light illumination system, according to one embodiment.

Referring to FIGS. 1A and 1B, a vehicle 10 in the form of a wheeled automotive crossover vehicle is generally shown having a body 14 and a lift gate 18, according to one embodiment. The body 14 includes a roof 22 to which the lift gate 18 is operably coupled. A bumper 26 defining a license plate area 30 is coupled to the body 14. The lift gate 18 is operable between a substantially closed position (FIG. 1A) and substantially open position (FIG. 1B). Rotation of the lift gate 18 from the closed position to the open position allows a cargo space 34 defined by the body 14 to be accessed from a rear of the vehicle 10. In the substantially closed position, the lift gate 18 closes off access to the cargo space 34 and exposes an exterior surface 38. In the open position, the lift gate 18 allows access to the rear cargo space 34 and closes off access to the rear cargo space and exposes an interior surface 42. The vehicle 10 includes two taillights 46 disposed on the body 14 on opposite sides of the lift gate 18.

Figure 2A:
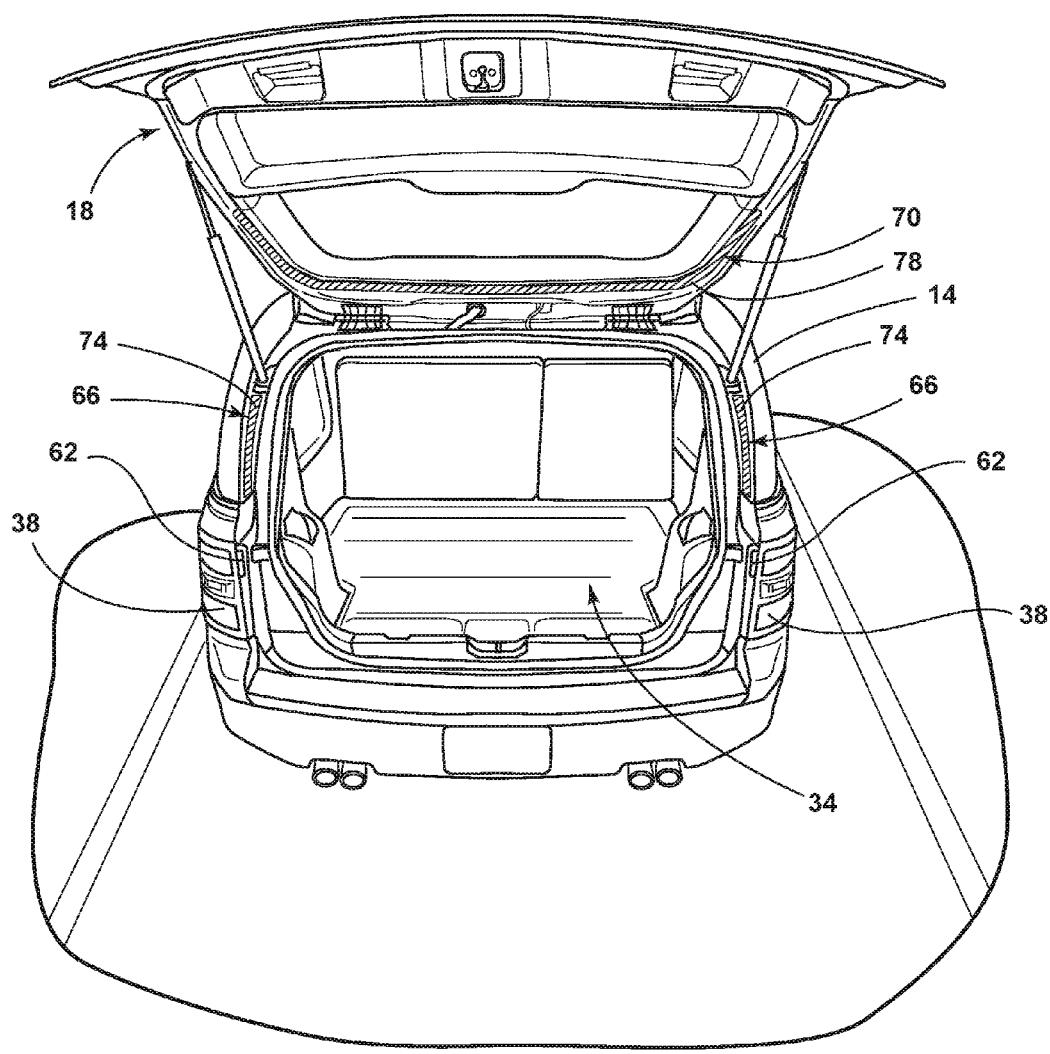
FIG. 2A illustrates a rear elevational view of the vehicle with the lift gate in the open position.
Figure 2B:
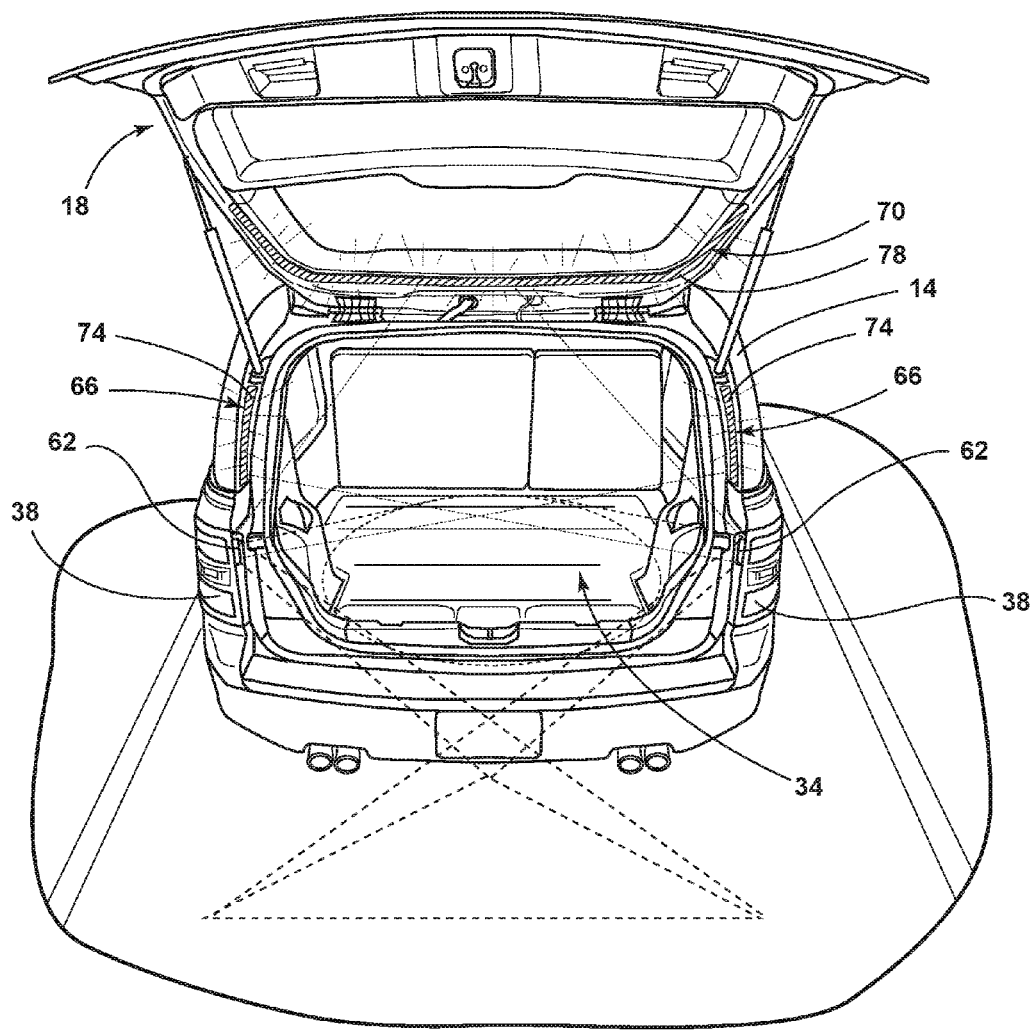
FIG. 2B illustrates a rear elevational view of the vehicle with the lift gate in the open position further illustrating the light-illumination system.

Referring now to FIGS. 1B, 2A and 2B, in the depicted example, each of the taillights 46 includes a cargo lamp 62 configured to emit light. It will be understood that although depicted with two cargo lamps 62, the vehicle 10 may include two taillights 46 but only one cargo lamp 62, or two taillights 46 with more than two cargo lamps 62. The cargo lamps 62 are configured to provide general illumination to a ground beneath the vehicle 10, the bumper 26, the license plate area 30, a trailer hitch if present, the cargo space 34 and/or the interior surface 42 of the lift gate 18. The cargo lamps 62 may be positioned proximate a top of the taillights 46 such that the cargo lamps 62 are advantageously placed to provide maximum illumination of light. The cargo lamps 62 may also be positioned on an inboard surface of the taillights 46 such that the cargo lamps 62 are concealed when the lift gate 18 is in the substantially closed position. In examples utilizing two or more cargo lamps 62 positioned on opposite sides of the vehicle 10 (FIG. 2A), the light emitted from the cargo lamps 62 may overlap on the ground below the vehicle 10, the bumper 26, the license plate area 30, a trailer hitch if present, the cargo space 34 and/or the interior surface 42 of the lift gate 18. It will be understood that the aforementioned illuminated areas may be individually lit, or lit in any combination using just one or more of the cargo lamps 62. For example, the passenger side cargo lamp 62 may illuminate the ground while the driver side cargo lamp 62 may illuminate the cargo space 34. The cargo lamps 62 may be positioned vehicle rearward sufficiently to allow light from the cargo lamps 62 to enter the cargo space 34. The cargo lamps 62 may utilize the light generated from lamp assemblies traditionally used in taillights, or may include separate light sources. For example, the cargo lamps 62 may include a separate light bulb, light emitting diode and/or other sources of illumination. The light sources of the cargo lamps 62 may be configured to emit white light, colored light and/or energy providing light (e.g., blue light and/or ultraviolet light) configured to interact with other portions of the vehicle as explained in greater detail below. The cargo lamps 62 may be positioned on inboard sides of the taillights 46 such that the cargo lamps 62 are concealed or substantially concealed while the lift gate 18 is in the closed position.

Referring now to FIGS. 2A and 2B, a body sill 66 is defined by the body 14 where the lift gate 18 contacts the body 14. The lift gate 18 defines a cooperating lift gate sill 70 which is in close proximity with the body sill 66 when the lift gate 18 is in the closed position. When the lift gate 18 is in the open position, both the body sill 66 and the lift gate sill 70 are exposed. Disposed on the body sill 66 is a first luminescent structure 74. In the depicted example, the first luminescent structure 74 is divided into two separate portions positioned on driver and passenger sides of the body sill 66. In other examples, the first luminescent structure 74 may extend around the body sill 66 in a continuous or semi-continuous manner. The first luminescent structure 74 may be formed in a pattern or include one or more indicia (e.g., text, writing, emblem, symbol, picture). Positioned on the lift gate sill 70 of the lift gate 18 is a second luminescent structure 78. Similar to the first luminescent structure 74, the second luminescent structure 78 may be positioned in a continuous or semi-continuous fashion on the lift gate sill 70 of the lift gate 18. Further, the second luminescent structure 78 may be formed in a pattern or include one or more indicia (e.g., text, writing, emblem, symbol, picture).

In various examples, the first and second luminescent structures 74, 78, may be configured to interact with the light emitted from the cargo lamp 62 to aid in illumination of the ground below the vehicle 10, the bumper 26, the license plate area 30, a trailer hitch if present and/or the cargo space 34 simultaneously. Additionally, the first and second luminescent structures 74, 78 may provide decorative or safety lighting for loading the vehicle 10 at night. In a first example, the first and second luminescent structures 74, 78 may interact with the light from the cargo lamp 62 by being optically reflective (e.g., a white material, polished metal, other lustrous materials). Reflection of the light from the cargo lamp 62 would allow the light to be reflected outwardly from the vehicle 10 and/or downward toward the cargo space 34 and/or ground (FIG. 2B). Additionally or alternatively, the first and/or second luminescent structures 74, 78 may include a phosphorescent or photoluminescent material. In phosphorescent material examples, the first and/or second 74, 78 luminescent structures may be formed by dispersing one or more persistent phosphorescent materials in a polymer matrix to form a homogenous mixture using a variety of methods. For example, the first and/or second luminescent structures 74, 78 may be rendered by dispersing the phosphorescent materials into a solid state solution (homogenous mixture in a dry state) that may be incorporated in a polymer matrix formed by extrusion, injection molding, compression molding, calendaring, thermoforming, etc. The polymer and phosphorescent material mixture could then be coupled or applied to the body sill 66 and/or the lift gate sill 70. Additionally or alternatively, a phosphorescent structure (e.g., layer, coating or film) may be disposed on an exterior surface of the first and/or second luminescent structures 74, 78 (e.g., on a base such as a polymer or metal). In layer or coating examples, the layers or coatings which incorporate the phosphorescent materials may be applied by painting, screen printing, flexography, spraying, slot coating, dip coating, roller coating, bar coating, and/or any other methods known in the art. It will be understood that appropriate protection layers, overcoat layers, environmental barriers and/or optics may be applied to the first and/or second luminescent structures 74, 78.

The persistent phosphorescent materials may be defined as being able to store an activation emission and release light gradually (i.e., a perceptible glow), for a period of several minutes or hours, once the activation emission is no longer present. The decay time may be defined as the time between the end of excitation from the activation emission and the moment when the light intensity of the phosphorescent structure drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent material, according to one embodiment, may be operable to emit light at or above an intensity of 0.32 mcd/m$^2$ after a period of 10 minutes. Additionally, the persistent phosphorescent material may be operable to emit light above or at an intensity of 0.32 mcd/m$^2$ after a period greater than 30 minutes, greater than 60 minutes, greater than 2 hours, greater than 5 hours, greater than 10 hours or greater than 24 hours. Accordingly, the persistent phosphorescent material may continually illuminate in response to excitation through a plurality of excitation sources emitting an activation emission, including, but not limited to, ambient light (e.g., the sun), light from the cargo lamp 62, light sources located within the vehicle 10 and/or any other light source disposed onboard or exterior to the vehicle 10. The periodic absorption of the activation emission from the excitation sources may provide for a substantially sustained charge of the persistent phosphorescent materials to provide for a consistent passive illumination. For example, if the lift gate is left in the open position for an extended period of time, the cargo lamp 62 may be pulsed, or otherwise periodically be activated to charge the phosphorescent materials, such that the first and/or second luminescent structures 74, 78, provide a constant or changing level of emitted phosphorescent light. In some embodiments, a light sensor may monitor the light illumination intensity of the phosphorescent material and initiate an excitation source (e.g., light from the cargo lamp 62) when the illumination intensity falls below 0.32 mcd/m$^2$, or any other predefined intensity level.

The persistent phosphorescent materials may correspond to alkaline earth aluminates and silicates, (for example, doped di-silicates), or any other compound that is capable of emitting light for a period of time once an activation emission is no longer present. The persistent phosphorescent materials may be doped with one or more ions, which may correspond to rare earth elements, for example, $Eu^{2+}$, $Tb^{3+}$ and $Dy^{3+}$. Mixed polymeric examples of the first and/or second luminescent structures 74, 78 may include between about 0.1% to about 25.0% of the persistent phosphorescent material, either by weight or mole fraction. In embodiments utilizing a layer of phosphorescent material on the first and/or second luminescent structures 74, 78, the layer may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof. The light emitted from the phosphorescent material, and thereby the first and/or second luminescent structures 74, 78, may be of a desired brightness such that the desired level of illumination within the cargo space 34 and/or on the ground is achieved. According to one embodiment, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions. In embodiments where the first and/or second luminescent structures 74, 78 form or include an indicia, the light emitted from the structures 74, 78 may be bright enough to facilitate a user (i.e., a human) to see the indicia, but not so bright that the indicia is not perceptible. It will be understood that the first luminescent structure 74 may include a first phosphorescent material and the second luminescent structure 78 may include a second phosphorescent material. The first and second phosphorescent materials may be the same material, or may be configured to output different colors, intensities or have different lengths of persistence.

According to an alternate example, 100 parts of a commercial solvent-borne polyurethane, such as Mace resin 107-268, having 50% solids polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane, may be blended to yield a low rare earth mineral phosphorescent layer or be used in the first and/or second luminescent structures. It will be understood that the compositions provided herein are non-limiting examples. Thus, any phosphor known in the art may be utilized for utilization as a phosphorescent material or layer without departing from the teachings provided herein. Moreover, it is contemplated that any long persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

The phosphorescent material may also include a short persistence material. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation and the moment when the light intensity of the phosphorescent light emitted from the phosphorescent materials drops below a minimum visibility of 0.32 mcd/m².

According to one embodiment, a $Ce^{3+}$ garnet may be utilized as the short persistence material, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some examples, the rare earth aluminum garnet type Ce phosphor, may serve as a phosphorescent material with ultra-short persistence characteristics, which can emit converted light by absorbing purple to blue excitation light emitted from a light source (e.g., the cargo lamps 62). It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally or alternatively, the first and/or second luminescent structures 74, 78 may be mixed with or include a structure having one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets, such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute or no human perceivable persistence).

Use of the disclosed first and second luminescent structures 74, 78, as well as the cargo lamps 62, may offer several advantages. For example, utilizing the cargo lamps 62 as part of the taillights 46 allows for a decrease in cost and part count due to lower associated shipping, manufacturing, wiring and assembly costs. Additionally, as the taillights 46 are sealed, an additional conformal coating for the cargo lamp 62 may not be necessary. Further, by utilizing cargo lamps 62 positioned on both the passenger side and the driver side of the vehicle 10, an overlapping light pattern may be achieved which provides for greater visibility of the bumper 26, the ground, the cargo space 34, as well as step and loading areas behind the vehicle 10. Moreover, existing trunk/cargo lights may be eliminated through the use of this disclosure thereby further decreasing part count and vehicle manufacturing cost. It will be understood that although the present disclosures was described in terms of a lift gate, the present disclosure may equally be applied to any door on a vehicle permitting access to the vehicle and its corresponding sills.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A vehicle comprising:
a body defining a cargo space and a lift gate sill;
a lift gate coupled to the body and operable between open and closed positions;
a taillight positioned at a rear end of the body; and
a cargo lamp positioned on a lift gate sill surface of the taillight such that the cargo lamp is positioned between the taillight and lift gate when the lift gate is in the closed position.

2. The vehicle of claim 1, wherein the cargo lamp is configured to direct light into a cargo space defined by the body.

3. The vehicle of claim 2, wherein the cargo lamp is configured to direct light toward a ground beneath the vehicle.

4. The vehicle of claim 1, wherein the cargo lamp is exposed when the lift gate is in the open position.

5. The vehicle of claim 1, wherein the cargo lamp is positioned proximate a top of the lift gate sill surface.

6. The vehicle of claim 1, wherein the cargo lamp is configured to emit at least one of blue and ultraviolet light.

7. The vehicle of claim 6, further comprising:
a luminescent structure positioned on a lift gate sill of the body.

8. The vehicle of claim 7, wherein the luminescent structure is substantially concealed when the lift gate is in a closed position.

9. A vehicle comprising:
a body defining a cargo space and a lift gate sill, the body coupled with a lift gate operable between substantially open and closed positions;
a taillight positioned at a rear end of the body; and
a cargo lamp positioned proximate a top of a lift gate sill surface of the taillight, wherein the cargo lamp is configured to emit light and is positioned between the taillight and the lift gate when the lift gate is in the closed position.

10. The vehicle of claim 9, wherein the cargo lamp is concealed when the lift gate is in the closed position.

11. The vehicle of claim 10, wherein the cargo lamp is exposed when the lift gate is in the open position.

12. The vehicle of claim 9, wherein the vehicle comprises a plurality of taillights, each of the taillights including a cargo lamp.

13. The vehicle of claim 9, wherein the cargo lamp is configured to emit at least one of blue and ultraviolet light.

14. A vehicle comprising:
a body defining a cargo space therein;
a lift gate operable between substantially open and closed positions, wherein the lift gate is operable between closed and open positions; and
a taillight which defines a cargo lamp positioned on a lift gate sill surface of the taillight such that the cargo lamp is positioned between the taillight and the lift gate when the lift gate is in the closed position.

15. The vehicle of claim 14, wherein the cargo lamp is positioned proximate a top of the taillight.

16. The vehicle of claim 14, wherein the cargo lamp is configured to illuminate the ground below the vehicle and the cargo space simultaneously.

17. The vehicle of claim 14, further comprising:
a luminescent structure positioned on the lift gate sill of the body.

18. The vehicle of claim 17, wherein the luminescent structure is a photoluminescent or phosphorescent structure.

19. The vehicle of claim 17, wherein the luminescent structure is an optically reflective structure.

20. The vehicle of claim 14, wherein the cargo lamp is configured to emit at least one of blue and ultraviolet light.

* * * * *